United States Patent [19]

Beane

[11] Patent Number: 4,780,705

[45] Date of Patent: Oct. 25, 1988

[54] OVERFILL SENSING SYSTEM

[75] Inventor: Michael J. Beane, Tampa, Fla.

[73] Assignee: Enterprise Brass Works of Florida, Inc., Tampa, Fla.

[21] Appl. No.: 13,023

[22] Filed: Feb. 10, 1987

[51] Int. Cl.$^4$ ............................................. G08B 21/00
[52] U.S. Cl. .................... 340/620; 73/304 C; 200/61.2; 324/61 R; 137/392; 137/386; 361/284
[58] Field of Search ............ 73/290 R, 304 R, 304 C; 340/612, 618, 620, 514, 515; 137/386, 392; 200/61.2; 361/284; 307/116, 118; 324/61 P, 61 R, 65 P, 65 R

[56] References Cited

U.S. PATENT DOCUMENTS

| | | | |
|---|---|---|---|
| Re. 27,829 | 12/1973 | Tiffany | 307/118 |
| 3,657,556 | 4/1972 | Foster | 73/304 R |
| 4,020,488 | 4/1977 | Martin | 137/392 |
| 4,171,932 | 10/1979 | Miller | 307/118 |
| 4,231,025 | 10/1980 | Turner, Jr. | 340/620 |
| 4,244,385 | 1/1981 | Hotine | 73/304 R |
| 4,555,941 | 12/1985 | Fathauer | 73/304 C |
| 4,639,611 | 1/1987 | Sticher | 307/116 |

Primary Examiner—Joseph A. Orsino, Jr
Assistant Examiner—Jill D. Jackson
Attorney, Agent, or Firm—Basile and Hanlon

[57] ABSTRACT

An overfill sensing system uses a capacitive sensor (12) on the interior of a tank for sensing the presence of a liquid to cease the filling process. The capacitive sensor (12) includes a sensing capacitor (16) and a reference capacitor (18) on separate arms of a bridge circuit (22). An oscillator (28) supplies an AC signal to the bridge circuit (22) divided by a variable resistor (30) to balance the bridge (22). A comparator (24) receives the output on each arm of the bridge (22) to sense a differential therebetween. When a liquid reaches the sensing capacitor (16), the capacitance changes from a predetermined capacitance, thereby changing the differential. A control circuit (14) is responsive to the differential at the output of the comparator (24) for visually indicating the status of the filling process and ceasing the filling process from the filling facility when a liquid has been detected.

16 Claims, 4 Drawing Sheets

OVERFILL SENSING SYSTEM

TECHNICAL FIELD

This invention relates to a capacitor-type sensor assembly to indicate when a liquid reaches a specific point and to produce a signal to stop filling in a tank in response to the capacitance sensor.

BACKGROUND ART

Petroleum tankers were heretofore filled with petroleum into a hole in the upper portion of the tank, wherein the fullness is determined visually. Due to regulations, the tankers have now been required to be filled through a hole in the bottom of the tank, the same hole from which the fuel is emptied. Therefore, sensors are required on the upper portion of the tank to indicate when the tank is full since visual determination is no longer possible. Generally, the sensor will be directly connected to the filling facility or station, whereby a signal is produced by the sensor when a liquid is detected to cease filling from the facility. A plurality of sensors have been used, mainly thermistors, float switches, or fiber optic probes. The float switches and thermistors have been ineffective because of mechanical and electrical problems and because truck drivers are able to tamper with and disconnect them. A problem with the fiber optic probe is that it needs to be cleaned occasionally, otherwise it would always indicate the presence of the liquid.

One type of prior art capacitor sensor assembly includes a capacitive probe and a reference capacitor connected at a common point. Two different potential signals are supplied to each the capacitive probe and reference capacitor. Any excursions of potential at the common point indicates the status of the capacitive probe, whether it has detected a liquid or not. Such an assembly is shown is U.S. Pat. No. 4,107,658 in the name of William Frank Hill granted on Aug. 15, 1978 which discloses a capacitive sensing system which includes a reference capacitor and capacitive probe with two different potential signals applied to produce an excursion at a common point indicating the state of the capacitive probe. The problem with this type of assembly is that it is not completely temperature compensative.

SUMMARY OF THE INVENTION AND ADVANTAGES

The invention is an overfill protection system for use in petroleum tankers to cease the filling process from a filling facility to a tank when the liquid reaches a predetermined level in the tank. The assembly includes sensor means for disposition on the interior of the tank for detecting the presence of the liquid. A control means is used for ceasing the filling in response to a positive sensor signal from the sensor means and to allow filling in response to a negative sensor signal. The assembly is characterized by the sensor means including a sensing capacitor having one probe connected to ground and located on the interior of the tank for changing from a predetermined capacitance in response to contact with a liquid. Also included is a reference capacitor. The assembly includes a positive voltage source and a bridge circuit having two arms connected at a common input juncture to the voltage source and with a first of the arms including the sensing capacitor and the second of the arms including the reference capacitor. A comparator means is responsive to the outputs of the arms to sense the differential therebetween and to continuously produce the positive sensor signal when the capacitance of the sensing capacitor increases from the predetermined capacitance.

The present invention improves the prior art by using a capacitance sensor which is temperature and voltage compensative.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
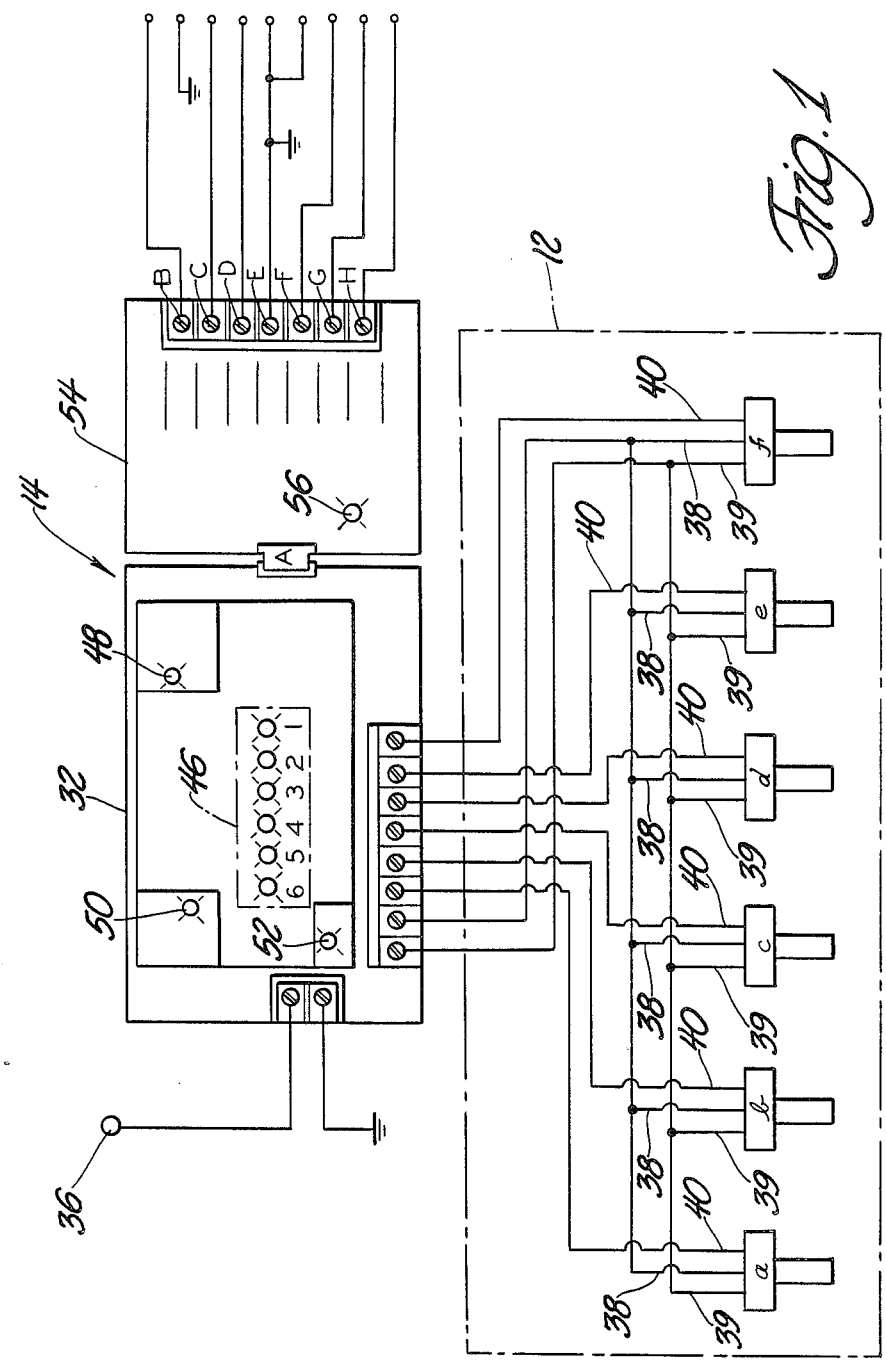
FIG. 1 is a schematic view of the subject invention.

An overfill protection assembly for use in petroleum tankers to cease the filling process from a filling facility to a tank when the liquid reaches a predetermined level in the tank is generally shown in FIG. 1. The assembly includes sensor means 12 for disposition on the interior of the tank for detecting presence of a liquid. The assembly also includes control means, generally shown at 14, for ceasing the filling in response to a positive sensor signal from the sensor means 12 and to allow filling in response to a negative sensor signal. The positive sensor signal is positive in potential and the negative sensor is negative in potential. The control means 14 is generally located on the lower, exterior portion of the tanker trailer where it can be visually seen by operators.

Figure 4:
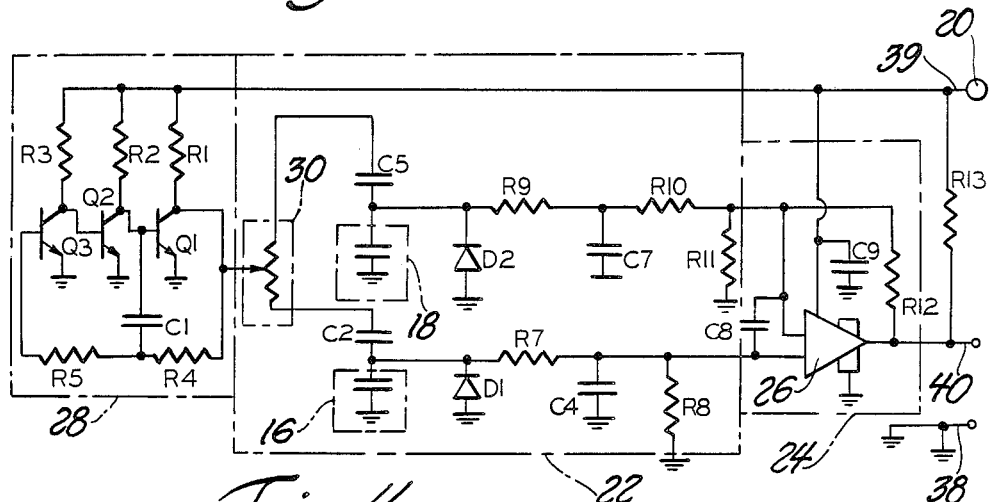
FIG. 4 is a schematic diagram of the capacitive sensor.

As best shown in FIG. 4, sensor means 12 includes a sensing capacitor 16 which has one probe connected to ground and which is located on the interior of the tank for changing from the predetermined capacitance in response to contact with the liquid. A capacitance sensor is suitable for this type of assembly because after a liquid reaches the capacitance sensor probe and is then emptied, the probe will drain easily to indicate a state of no overfill. By using a capacitive sensor in the overfill protection assembly, the reaction time and speed of the assembly is enhanced with respect to other sensing methods. The sensing capacitor 16 is connected to ground for additional safety purposes to ensure proper discharging to ground rather than into the sensor means 12.

The sensor means 12 also includes a reference capacitor 18 whose capacitance is equal to the predetermined capacitance of a sensing capacitor 16. A positive voltage source 20 is used for the sensor means 12. A bridge circuit 22 is used which has two arms connected at a common input juncture to the voltage source 20. A first of the arms includes the sensing capacitor 16 and a second of the arms includes the reference capacitor 18 which is connected to ground. A comparator means 24 is responsive to the input ends of the arms to sense the differential therebetween and to continuously produce the positive sensor signal when the capacitance of said sensing capacitor 16 increases from the predetermined capacitance.

The comparator means 24 includes an operational amplifier 26 which has a non-inverting input connected to and receiving the output of the second arm, which arm includes the reference capacitor 18, and an inverting input connected to and receiving the output of the first arm, which arm includes the sensing capacitor 16.

The operational amplifier 26 produces the positive sensor signal in response to the sensing capacitor 16 increasing its capacitance away from the predetermined capacitance. The sensor means 12 also includes an oscillator means 28 for producing a single positive signal which is used as the voltage source 20. A variable resistor means 30 receives the single positive signal to supply voltage to both the reference capacitor 18 and the sensing capacitor 16 and balance the bridge circuit 22. In other words, the variable resistor means receives the single positive signal and divides the signal between two arms by a predetermined ratio. This predetermined ratio is adjustable by adjusting the variable resistor 30. This compensates for any tolerance or mismatching of component values in the bridge circuit 22.

In over all operation, the first arm containing the sensing capacitor 16 in a dry state will have an approximately equal or slightly greater magnitude than the second arm which contains the reference capacitor 18. As a liquid or material comes in contact with the sensing capacitor 16 the dielectric constant changes which increases the capacitance of the sensing capacitor 16 moving the capacitance value away from the predetermined capacitance which will shunt more potential to ground. In this case, less voltage will be received by the comparator means 24 from the first arm. Therefore, the second arm of the bridge circuit 22 will contain a higher potential which will cause the comparator means 24 to produce the positive sensor signal from the prior state of a negative potential sensor signal. The positive signal represents that liquid has been sensed by the sensing capacitor 16. A negative sensor signal represents that a liquid is not detected and therefore filling may continue. Therefore, having the oscillator means 28 divided between each of the arms at the common juncture with the comparator means 24 receiving each of the arms, any abnormal effects of temperature or voltage variation will be compensated for in this design. In other words, the single positive signal is split between the two arms by the predetermined ratio, a fixed ratio. The comparator means 24 will sense the differential of the potentials on the first and second arms, the actual magnitudes having little effect.

The reference capacitor 18 may alternatively be an adjustable capacitor for balancing the bridge circuit 22. In this case, the variable resistor 30 would not be needed.

Figure 2:
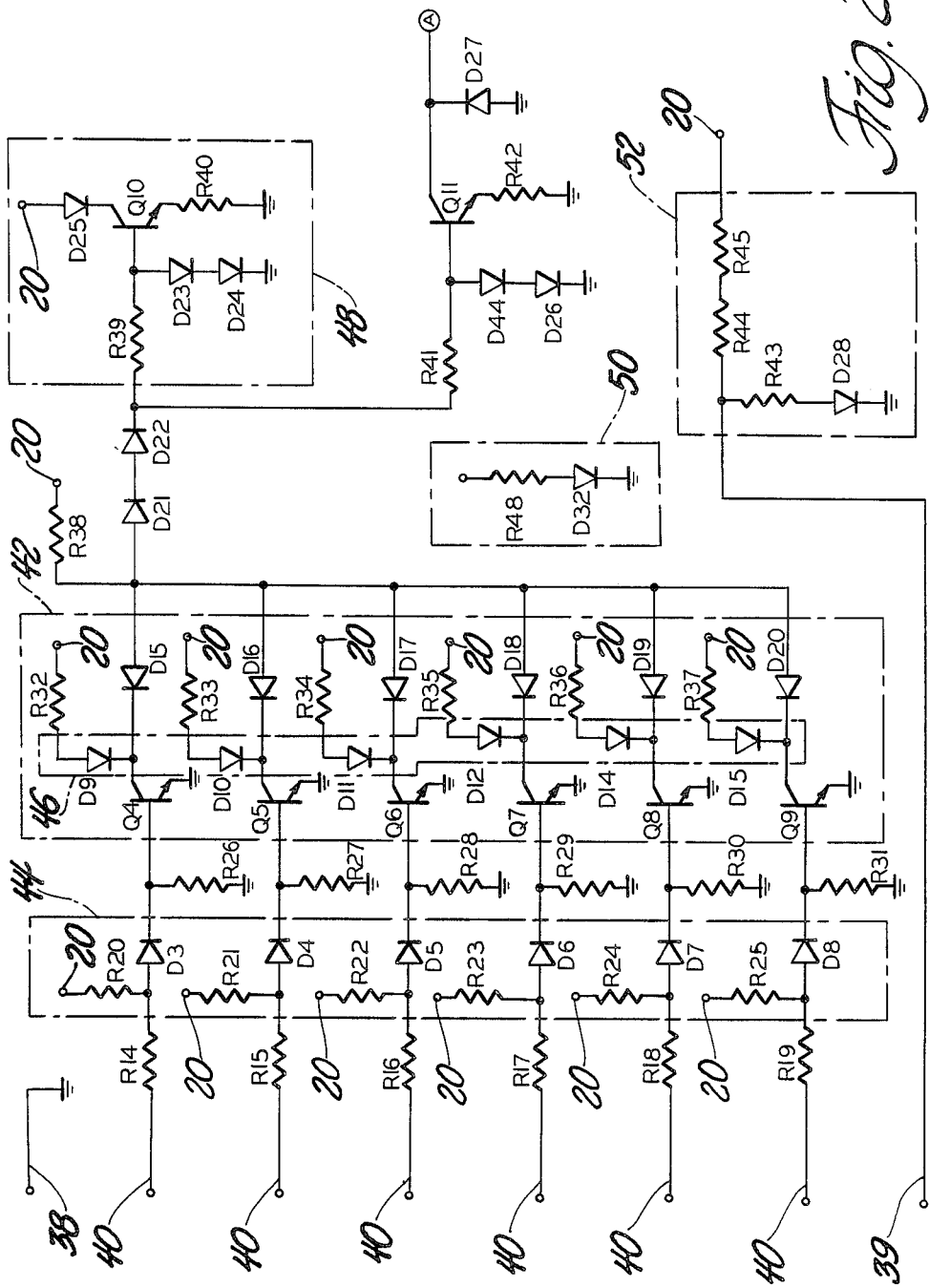
FIG. 2 is a schematic diagram of the integration means of the subject invention.
Figure 3:
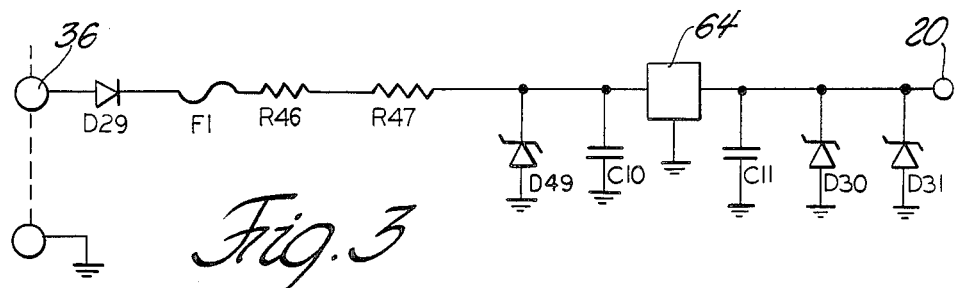
FIG. 3 is a schematic diagram of the power supply means.

The control means 14 includes an integration means 32, FIGS. 2 and 3 for supplying power to the sensor means 12 and receiving the sensor signal to cease filling in response to a positive sensor signal by producing a control signal (A). The integration means 32, FIGS. 2 and 3 in effect controls the sensor means 12 and controls the signal to cease the filling. The integration means 32, FIGS. 2 and 3 includes a power supply means FIG. 3 for receiving an external voltage 36 and producing the limited positive voltage source 20 to the integration means 32, FIGS. 2 and 3 and the sensor means 12. The external voltage 36 may be the battery of a vehicle or a truck, such as 12 volts and the sensor means 12 requires 6 volts. In the specific embodiment, one to six sensor means 12a-f may be used to sense the liquid along different locations or compartments of a tank. Three electrical lines 38, 39, 40 run from the integration means to each of the sensor means 12a-f. The electrical lines 38, 39, 40 include the limited voltage line 38, a ground line 39, and a return line 40 carrying the sensor signal.

The integration means 32, FIGS. 2 and 3 includes a driver means 42 for receiving each of the sensor signals to produce the control signal (A) to cease filling when at least one of the sensor signals is positive. The driver means 42 acts as an amplifier for receiving the positive sensor signal to send the signal to the facility to cease filling.

The sensor means 12 also includes a fault means 44 for producing a positive sensor signal when the sensor means is disconnected from the integration means 32, FIGS. 2 and 3. Therefore, tampering of any sort or loss of one of the lead lines 38, 39, 40 to the sensor means 12a-f will be compensated for by disallowing filling of the tanker by producing the positive sensor signal to the integration means 32, FIGS. 2 and 3.

The integration means 32, FIGS. 2 and 3 includes sensor overfill indication means 46 responsive to the sensor means 12 for visually indicating when the liquid has reached the sensor means 12. The sensor overfill indication means 46 is in the form of LEDs (light emitting diode) D9, D10, D11, D12, D13, D14 which will be turned on when a positive sensor signal is received. Each of the six sensor means 12a-f includes a respective LED D9, D10, D11, D12, D13, D14 for independently lighting when the specific sensor means 12a-f has detected a liquid. When a plurality of sensor means 12a-f are used, the sensor means 12a-f will be located along different locations or compartments of the upper portion of the tank to cease filling when only one sensor means 12a-f has detected the liquid.

The integration means 32, FIGS. 2 and 3 also includes a first permit indication means 48 for visually indicating the allowance of filling responsive to the sensor means 12. The first permit indication means 48 contains an LED D25 which is constantly lit during filling. Once an overfill state is detected the LED D25 turns off which indicates that filling is no longer permitted. The integration means 32, FIGS. 2 and 3 also includes power indication means 50 for visually indicating that power is being received for the operation of the control means 14. The power indication means 50 also includes an LED D32 which is lit as long as power is received by the integration means 32, Figs. 2 and 3 from the external voltage source or battery 36. The integration means 32, FIGS. 2 and 3 includes sensor power indication means 52 for visually indicating that power is being supplied to the sensor means 12. This sensor power indication means 52 includes an LED D28 which is lit as long as power is being supplied to the sensor means 12. If for some reason, power is disconnected from the control means 14 or the sensor means 12, the LEDs D28, D32 will turn off which will indicate a disconnection.

The integration means 32, FIGS. 2 and 3 will receive each sensor signal from the respective sensor means 12a-f and after the sensor overfill indication means 46, the integration means 32, Figs. 2 and 3 combines the sensor signals into one producing the control signal (A). The control signal (A) is received by the first permit indication means 48 for the controlling thereof.

Figure 5A:
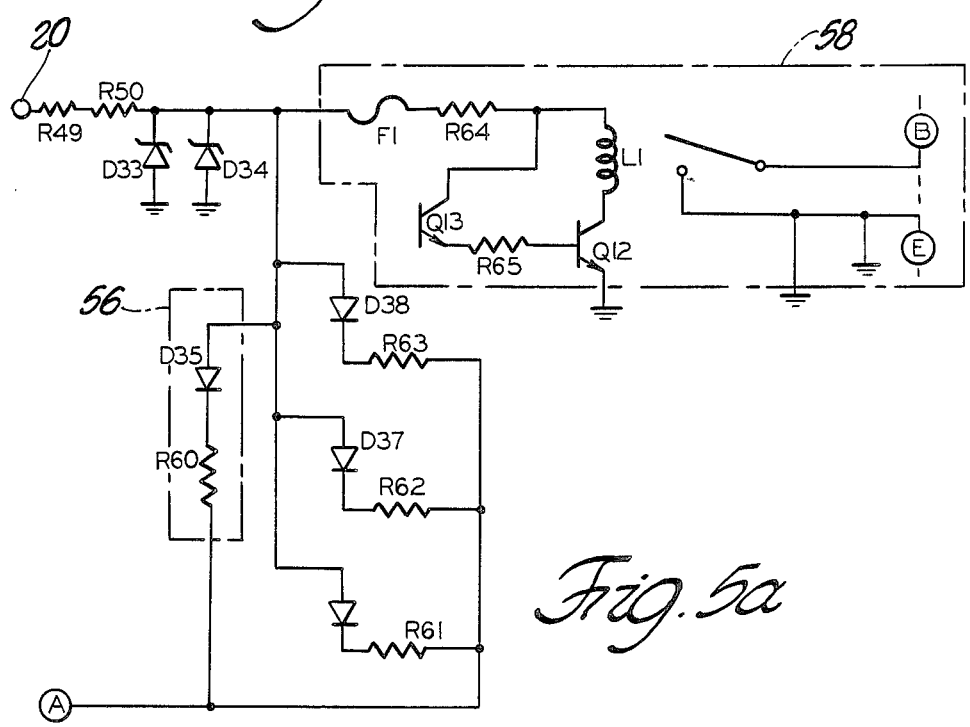
FIGS. 5a and 5b are a schematic diagram of the translator means of the subject invention.
Figure 5B:
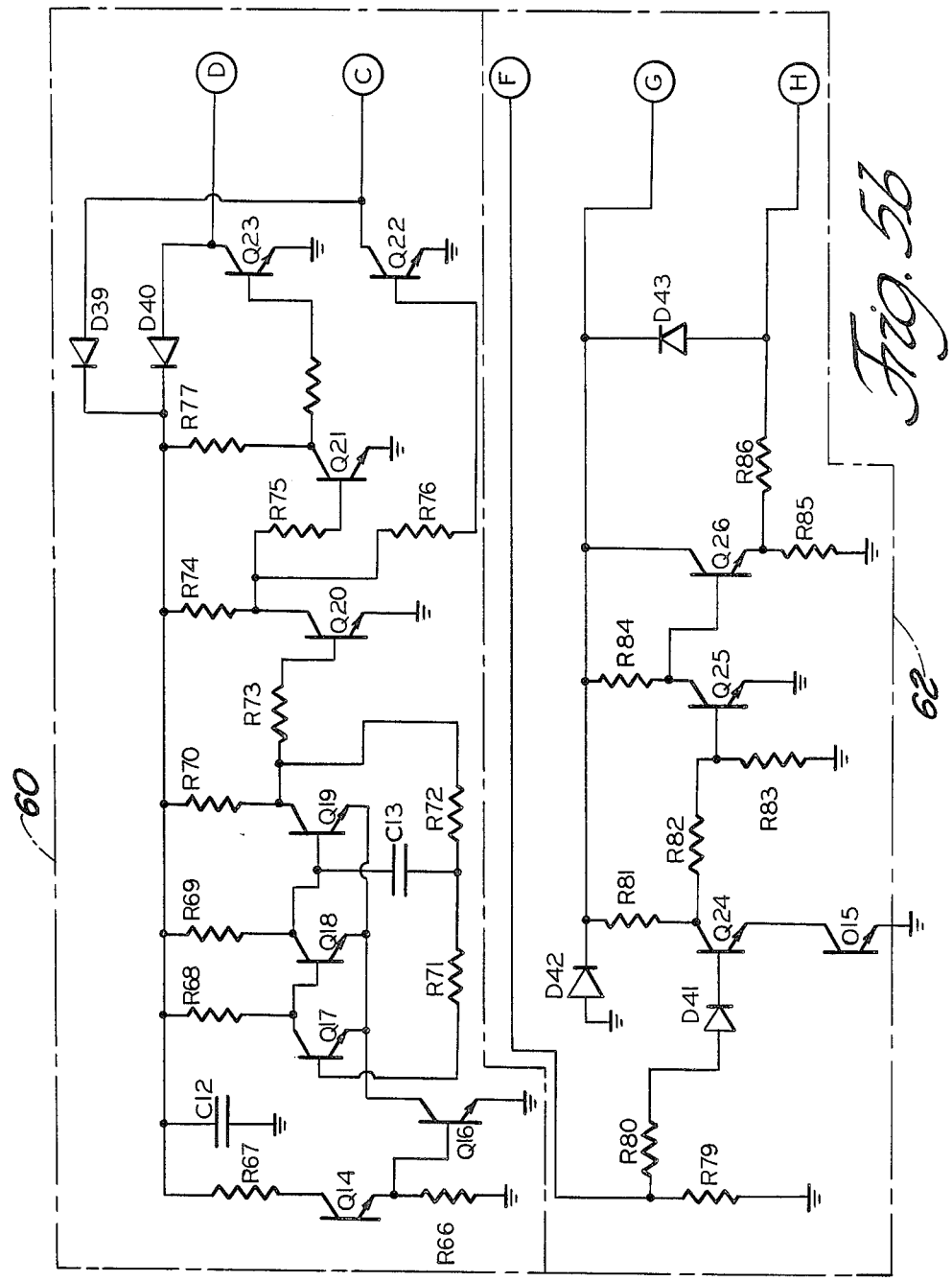

The control means 14 includes a translator means 54, FIGS. 5a and 5b for receiving the control signal (A)

from the integration means 32, FIGS. 2 and 3 and producing a plurality of command signals to control the filling facility wherein each may comprise a different loading monitor. The filling facility is a location from which petroleum is filled into the tankers. Each filling facility is independently owned and therefore different loading monitors are used. Presently the different loading monitors used are responsive to float, thermistor, or optic probe type sensors. Each type of sensor produces a different signal, and independent monitors will be responsive to one of these signals. Therefore, the purpose of the translator means 54, FIGS. 5a and 5b is to receive the control signal (A) from the integration means 32, FIGS. 2 and 3 and to produce a plurality of command signals which will operate any one of the different monitors.

The translator means 54, FIGS. 5a and 5b includes a second permit indication means 56 for visually indicating that the control signal (A) from the integration means has been received by the translator means 54, FIGS. 5a and 5b and that the filling process will be allowed. The second permit indication means 56 includes an LED D35 which will be always lit unless overfill has been detected, at which time the LED will turn off.

The first permit indication means light 48 and the second permit indication means light 56 will turn on and off simultaneously when the filling is to be ceased. If the second permit light 56 remains on while the first permit light 48 is off, this will indicate that the translator means 54, FIGS. 5a and 5b and the integration means 32, FIGS. 1, 2 and 3 are not properly connected or functional.

The translator means 54, FIGS. 5a and 5b includes a first transposing circuit 58 for producing a first command signal (B, E) analogous to a float sensor. A second transposing circuit 60 produces a second command signal (D, C, E) analogous to a thermistor sensor. A third transposing circuit 62 produces a third command signal (F, G, H) to the filling facility analogous to an optic sensor. The transposing circuits 58, 60, 62 are isolated from and optically connected to the translator means 54, FIGS. 5a and 5b to protect the control means 14 from high voltages by opto-isolators (D38, Q13), (D37, Q14), (D36,Q15). The transposing circuits 58, 60, 62 are each connected to a socket which are attached to the tank trailer which receive a cable plug from any of the loading facilities.

Therefore, by use of the control means 14, a capacitive type sensing system may be used which has the benefit of temperature and voltage compensation and also proper drainage and tampering proof network. The control means 14 can be used with any of the independently owned controllers of the filling facilities for the proper operation thereof.

The circuitry of the sensor means 12 includes a first resistor R1, second resistor R2, and thrid resistor R3 connected to the voltage source 20. A first transistor Q1, second transistor Q2, and third transistor Q3 are each respectively connected to the first R1, second R2, and third R3 resistors at their collectors. A fourth resistor R4 is connected to the collector of the first transistor Q1, a first capacitor C1 is connected to the fourth resistor R4 and to the collector of the second transistor Q2. A fifth resistor R5 is connected to the fourth resistor R4 and to the base of the third transistor Q3. The third transistor Q3 has its collector connected to the base of the second transistor Q2 and the second transistor Q2 has its collector connected to the base of the first transistor Q1. The variable resistor R6 is connected to the collector of the first transistor Q1 and the fourth resistor R4. A second capacitor C2 is connected to the variable resistor 30, and the sensing capacitor C3 is connected to the second capacitor C2 and to ground. A first diode D1 is connected between the second capacitor C2 and the sensing capacitor 16, a sixth resistor R7 is connected to the first diode D1. A third capacitor C4 is connected to ground and to the sixth resistor R7. A seventh resistor R8 is connected to ground and to the third capacitor C4. A fourth capacitor C5 is connected to the variable resistor 30, and the reference capacitor 18 is connected to ground and to the fourth capacitor C5. A second diode D2 is connected between the fourth capacitor C5 and the reference capacitor 18, an eighth resistor R9 is connected to the second diode D2, a fifth capacitor C7 is connected to ground and to the eighth resistor R9, a ninth resistor C10 is connected to the fifth capacitor C7, and a tenth resistor R11 is connected to the ninth resistor R10 and ground. The operational amplifier 26 has its non-inverting input connected to the junction of the ninth R10 and tenth R11 resistors, and the inverting input is connected to the seventh resistor R8. A sixth capacitor C8 interconnects the two inputs. An eleventh resistor R12 is connected to the non-inverting input as feedback. A twelfth resistor R13 is connected between the output of the operational amplifier 26 and the voltage source 20. The output of the operational amplifier 26 produces the sensor signal.

The integration means 32, FIGS. 2 and 3 includes a series of six inputs resistors R14, R15, R16, R17, R18, R19 each receiving one of the sensor output lines. Each of the six input sensors 12a–f is connected to one of six fault resistors R20, R21, R22, R23, R24, R25 which are connected to the voltage source 20. One of six sensor overfill induction LEDs D3, D4, D5, D6, D7, D8 is connected to one of said input resistors R14, R15, R16, R17, R18, R19. One of said six sensor overfill indication grounded resistors R26, R27, R28, R29, R30, R31 is connected to one of the six input diodes D3, D4, D5, D6, D7, D8. One of six driver transistors Q4, Q5, Q6, Q7, Q8, Q9 is connected to one of the six sensor overfill indicators D3, D4, D5, D6, D7, D8. The voltage source 20 is connected to each of six driving limiting resistors R32, R33, R34, R35, R36, R37 each of which are connected to one of the six LEDs D9, D10, D11, D12, D13, D14 each of which are connected to one of the collectors of the six driver transistors Q4, Q5, Q6, Q7, Q8, Q9. One of six protection diodes D15, D16, D17, D18, D19, D20 is connected to each collector of the six driver transistors Q4, Q5, Q6, Q7, Q8, Q9, wherein the output signals of the six protection diodes D15, D16, D17, D18, D19, D20 are combined to produce the control signal (A). A first integration limiting resistor R38 is connected to the combined lines and to the voltage source 20. A first pair of integration diodes D21, D22 receives the control signal (A).

A first integration resistor R41 is connected to the first pair of integration diodes D21, D22, a second pair of integration diodes D44, D26 are connected to the first integration resistor R41, a first integration transistor Q11 has it base connected to the second pair of integration diodes D44, D26, a second integration resistor R42 is connected to the emitter of transistor Q11 and ground, a first integration diode D27 is connected to the collector of the first integration transistor Q11, the output of which produces the control signal (A) to the transmitter means. A third integration resistor R48 is connected to the voltage source and connected to power supply integration means LED D32 and ground. The integration means includes first and second sensor supply resistors R45, R44 connected to a voltage source. A third sensor supply resistor R43 is connected to the second sensor supply resistor R44, and the sensor power indication means LED D28 is connected to the third sensor supply resistor R43 and ground. The power is supplied to the sensors 12a-f from the junction of the third sensor supply resistor R43 and the second sensor supply resistor R44. The first permit indication means 48 includes a first permit resistor R39 connected to the first pair of integration diodes D21, D22, the pair of first permit diodes D23, D24 are connected to the first permit resistor R39. A first permit transistor Q10 has its base connected to the first permit pair of diodes D23, D24, the first permit indication means LED D25 is connected to the voltage source 20 and to the collector, and a second permit resistor R40 is connected to the emitter and ground. The power supply means FIG. 3 includes a first power supply diode D29 connected to the battery 36 or the like, a fuse F1 connected to the output of the first power supply diode D29, a first power supply resistor R46 connected to the fuse, a second power supply resistor R47 connected to the first power supply resistor R46, a second power supply diode D49 connected to the second power supply resistor R47, a first power supply capacitor C10 connected to the second power supply resistor R47, a regulator chip 64 connected to the second power supply resistor R47, a second power supply capacitor C11 connected to the regulated chip 64, a third power supply diode D30 connected to the regulator chip 64, a fourth power supply diode D31 connected to the chip, at which point is the voltage source 20 which is supplied to the integration means 32, FIGS. 2 and 3.

The translator means 54, FIGS. 5a and 5b includes a first translator diode R60 connected to the control signal (A), a first translator diode D35 which is the second permit indication means LED connected to the first translator resistor R60, a second translator resistor R61 connected to the control signal (A), a second translator diode D36 connected to the second translator resistor R61 and connected to the first translator diode D35, a third translator resistor R62 connected to the control signal (A), a third translator diode D37 connected to the third translator resistor R62 and to the first translator diode D35, a fourth translator resistor R63 connected to the control signal (A), a fourth translator diode D38 connected to the fourth translator resistor R63 and to the first translator; diode D35. A fifth translator resistor R49 is connected to the voltage source, a sixth translator resistor R50 is connected to the fifth translator resistor R49, a first zener diode D33 is connected to the sixth translator resistor R50, a sixth zener diode D34 is connected to the sixth translator resistor R50, and a sixth translator resistor R50 is connected to the first translator diode D35 and a fourth translator diode D38 and a third translator diode D37 and a second translator diode D36.

The first controller 58 includes a fuse F2 which is connected to the sixth translator resistor R50, and a seventh translator resistor R54 is connected to the fuse F2, a first optic transistor Q13 is optically connected to the fourth translator diode D38 and has its collectors connected to the seventh translator resistor R64, an eighth translator resistor R65 is connected to the emitter, a first translator transistor Q12 has its base connected to the eighth translator resistor R65, and an inductive coil L1 is connected between the seventh translator resistor R64 and the collector of the first translator transistor Q12. The inductor L1 controls a switch S1 which closes a circuit to ground.

The second controller 60 includes a second phototransistor Q14 connected to the third translater diode D37, a ninth translator resister R66 connected to the emitter of the second photo transistor Q14, a tenth translator resistor R67 connected to the collector of the second photo-transistor Q14, a first translator capacitor C12 connected to the tenth translator resistor R67 and ground, a second translator transistor Q16 with its base connected to the emmitter of the second photo-transistor Q14, an eleventh translator resistor R68 connected to the tenth translator resistor R67, a third translator transistor Q17 with its collector connected to the eleventh translator resistor R68 and its collector connected to the second translator transistor Q16, a twelfth translator resistor R69 connected to the tenth translator resistor R67, a fourth translator transistor Q18 with its base connected to the eleventh translator resistor R68 and its collector connected to the twelfth translator resistor R69 and its emmitter connected to the second translator transistor Q16, a thirteenth translator resistor R67, a fifth translator transistor Q19 with its base connected to the collector of the fourth translator transistor Q18 and its collector connected to the thirteenth translator transistor R70 and its emitter connected to the second translator transistor Q16, a fourteenth translator resistor R71 connected to the base of the third translator transistor Q17, a second translator capacitor C13 connected to the base of the fifth translator transistor Q19 and the fourteenth translator resistor R70, a fifteenth translator resistor R72 connected to the fourteenth translator resistor R71 and the collector of the fifth translator transistor Q19, a sixteenth translator resistor R73 connected to the fifteenth translator resistor R72, a sixth translator transistor Q20 with its base connected to the sixteenth translator resistor R73, a seventeenth translator resistor and the collector of the sixth translator transistor Q20, an eighteenth translator resistor R76 connected to the collector of the sixth translator transistor Q20, a seventh translator transistor Q22 acting as a driver for representing a thermistor output, a ninteenth translator resistor R75 connected to the collector of the sixth translator transistor Q20, a seventh translator transistor Q21 with its base connected to the ninth translator resistor R75, a twentieth translator resistor R77 connected to the tenth translator resistor R78 connected to the collector of the seventh translator transistor Q21, an eighth translator transistor Q23 with its base connected to the twenty-first translator resistor R78 acting as a driver for representing a second thermistor output, a seventh translator diode D40 connected between the collector of the eighth translator transistor Q23 and the tenth translator resistor Q23 and the tenth translator transistor Q23 and the tenth translator resistor R67, and an eighth translator diode D39 connected between the collector of the seventh translator transistor Q22 and the tenth translator resistor R67.

The third controller 62 includes a third photo-transistor Q15 connected to the second translator diode D36, a ninth translator transistor Q24 with its emitter connected to the collector of the third photo-transistor Q15, a ninth translator diode D41 connected to the base of the ninth translator transistor Q24, a twenty-second translator resistor R80 connected to the ninth translator diode D41, a twenty-third translator resistor R79 connected to the twenty-second translator resistor R80 and ground, a twenty-fourth translator resistor R81 connected to the collector of the ninth translator diode D42 connected to the twenty-fourth translator resistor R81 and ground, a twenty-fifth translator resistor R82 connected to the collector of the ninth translator transistor Q24, a twenty-sixth translator resistor R83 connected to the twenty-fifth translator resistor R82 and ground, a tenth translator transistor Q25 with its base connected to the twenty-fifth translator resistor R82, a twenty-seventh translator resistor R84 connected to the twenty-fourth translator resistor R81 and the collector of the tenth translator transistor Q25, an eleventh translator transistor Q26 with its base connected to the collector of the tenth translator transistor Q25 and the collector connected to the twenty-fourth translator resistor R81, a twenty eighth translator resistor R85 connected to the emitter of the eleventh translator transistor Q26 and ground, a twenty-ninth translator resistor R86 connected to the emitter of the eleventh translator transistor Q26, and a tenth translator diode D43 connected between the twenty-fourth translator resistor R81 and the twenty-ninth translator resistor R86 producing the optic probe signal.

The opto-isolators are schematically shown as diodes and transistors in FIGS. 5a and 5b. The first opto-isolator is the fourth translator diode D38 acting with the first opto-transistor Q13. The second opto-isolator is the third translator diode D37 acting with the second optic transistor Q14. The third opto-isolator is the second translator diode D3 acting with the third opto-transistor Q15.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. An overfill protection assembly for use in petroleum tankers to cease the filling process from a filling facility to a tank when the liquid reaches a predetermined level in the tank, said assembly comprising; sensor means (12) for disposition on the interior of the tank for producing a positive sensor signal when the presence of the liquid is detected, control means (14) for ceasing the filling in response to a positive sensor signal and to allow filling in response to a negative sensor signal, including integration means for supplying power to sensor means and for receiving said positive sensor signal to cease filling by producing a control signal (A), and characterized by said sensor means (12) including a sensing capacitor (16) having one probe connected to ground and located on the interior of said tank for changing from a predetermined capacitance in response to contact with liquid, a reference capacitor (18), a positive voltage source (20), a bridge circuit (22) having two arms connected at a common input juncture to said voltage source (20) and with a first of said arms including said sensing capacitor (16) and the second of said arms including said reference capacitor (18), comparator means (24) responsive to the outputs of said arms to sense the differential therebetween and to continuously produce said positive sensor signal when the capacitance of said sensing capacitor (16) increases from said predetermined capacitance, and translator means (54) for receiving a control signal (A) from the integration means (32) and producing a plurality of command signals which will operate any one of a float, thermistor, or optic probe type sensor loading monitor.

2. An assembly as set forth in claim 1 further characterized by said comparator means (24) including an operational amplifier (26) having a non-inverting input connected to said output of said second arm and an inverting input connected to said output of said first arm for producing said positive sensor signal in response to said sensing capacitor (16) increasing its capacitance from said predetermined capacitance.

3. An assembly as set forth in claim 2 further characterized by said control means (14) including integration means (32, FIGS. 2 and 3) for supplying power to said sensor means (12) and for receiving said positive sensor signal to cease filling by producing a control signal (A).

4. An assembly as set forth in claim 3 further characterized by said integration means (32, FIGS. 2 and 3) including power supply means (FIG. 3) which said power supply means receives an external voltage and limits said voltage to produce said positive voltage source (20) for supplying said integration means (32, FIGS. 2 and 3) and said sensor means (12).

5. An assembly as set forth in claim 4 further characterized by said integration means (32, FIGS. 2 and 3) including driver means (42) for receiving said positive sensor signal to produce said control signal (A) to cease filling.

6. An assembly as set forth in claim 5 further characterized by said sensor means (12) including oscillator means (28) for producing a positive supply signal, and variable resistor means (30) receiving said positive supply signal to supply to both said reference capacitor (18) and said sensing (16) for balancing said bridge circuit (22).

7. An assembly as set forth in claim 5 further characterized by said integration means (32, FIGS. 2 and 3) including fault means (44) for producing said positive sensor signal when said sensor means (12) is disconnected from said integration means (32, FIGS. 2 and 3).

8. An assembly as set forth in claim 7 further characterized by said integration means (32, FIGS. 2 and 3) including sensor overfill indication means (46) responsive to said sensor means (12) for visually indicating when the liquid has reached said sensor means (12).

9. An assembly as set forth in claim 8 further characterized by said integration means (32, FIGS. 2 and 3) including a first permit indication means (48) for visually indicating allowance of filling in response to said positive sensor signal of said sensor means (12).

10. An assembly as set forth in claim 9 further characterized by said integration means (32, FIGS. 2 and 3) including power indication means (50) for visually indicating that power is received for the operation of said control means (14).

11. An assembly as set forth in claim 10 further characterized by said integration means (32, FIGS. 2 and 3) including sensor power indication means (52) for visually indicating that power is being supplied to said sensor means (12).

12. An overfill protection assembly for use in petroleum tankers to cease the filling process from a filling facility to a tank when the liquid reaches a predetermined level in the tank, said assembly comprising; sensor means (12) including oscillator means (28) for producing a positive supply signal, and variable resistor means (30) for receiving said positive supply signal and supplying to both a reference capacitor (18) and a sensing capacitor (16) for balancing a bridge circuit (22), said sensor means (12) for disposition on the interior of the tank for producing a positive sensor signal when the presence of the liquid is detected, control means (14) for ceasing the filling in response to a positive sensor signal and to allow filling in response to a negative sensor signal, including integration means for supplying power to sensor means and for receiving said positive sensor signal to cease filling by producing a control signal (A).

13. An assembly as set forth in claim 12 further characterized by said translator means (54, FIGS. 5 and 6) including second permit indication means (56) for visually indicating the allowance of the filling process said in response to integration means (32, FIGS. 2 and 3).

14. An assembly as set forth in claim 13 further characterized by including a plurality of said sensing means (12a-f) comprising sensing capacitors with respective bridges and driver means and sensor overfill indication means, wherein said integration means combines each of said driver means to produce said control signal (A).

15. An assembly as set forth in claim 14 further characterized by said translator means (54, FIGS. 5 and 6) including a first transposing circuit (58) for producing a first command signal analogous to a float sensor, a second transposing circuit (60) for producing a second command signal analogous to a thermistor sensor, and a third transposing circuit (62) for producing a third command signal analogous to an optic sensor.

16. An overfill protection assembly for use in petroleum tankers to cease the filling process from a filling facility to a tank when the liquid reaches a predetermined level in the tank, said assembly comprising: sensor means (12) for disposition on the interior of the tank for producing a positive sensor signal when the presence of the liquid is detected, said sensor means (12) including oscillator means (28) for producing a positive supply signal, and variable resistor means (30) receiving said positive supply signal to supply to both a reference capacitor (18) and a sensing capacitor (16) for balancing a bridge circuit (22), a first resistor (R1) and a second resistor (R2) and a third resistor (R3) connected to a voltage source (20), a first transistor (Q1) and a second transistor (Q2) and a third transistor (Q3) having collectors and each respectively connected to said first resistor (R1) and said second resistor (R2) and said third resistor (R3) at the collectors, a fourth resistor (R4) connected to the collector of said first transistor (Q1), a first capacitor (C1) connected to said fourth resistor (R4) and to the collector of said second transistor (Q2), a fifth resistor (R5) connected to said fourth resistor (R4) and to the base of said third transistor (Q3), wherein said third transistor (Q3) has its collector connected to the base of said second transistor (Q2) and said second transistor (Q2) has its collector connected to the base of said first transistor (Q1), said variable resistor (R6) connected to the collector of said first transistor (Q1) and said fourth resistor (R4), a second capacitor (C2) connected to said variable resistor (30), said sensing capacitor (16) connected to said second resistor (C2), a first diode (D1) connected between said second capacitor (C2) and said sensing capacitor (16), a sixth resistor (R7) is connected to said first diode (D1), a third capacitor (C4) connected to ground and to said sixth resistor (R7), a seventh resistor (R8) connected to ground and to said third capacitor (C4), a fourth capacitor (C5) connected to said variable resistor (30), said reference capacitor (18) connected to ground and to said fourth capacitor (C5), a second diode (D2) connected between said fourth capacitor (C5) and said reference capacitor (18), an eighth resistor (R9) connected to said second diode (D2), a fifth capacitor (C7) connected to ground and to said eighth resistor (R9), a ninth resistor (R10) connected to said fifth capacitor (C7), a tenth resistor (R11) connected to said ninth resistor (R10) and ground, a operational amplifier (26) has its non-inverting input connected to the junction of said ninth resistor (R10) and tenth resistor (R11) and the inverting input connected to said sixth capacitor (C8), for producing said sensor signal, a sixth capacitor (C8) interconnects the inverting input and the non-inverting input of said operational amplifier (26), an eleventh resistor (R12) connected to the non-inverting input as feedback, a twelfth resistor (R13) connected between the output of said operational amplifier (26) and said voltage source (20), control means (14) for ceasing the filling in response to a positive sensor signal and to allow filling in response to a negative sensor signal, and characterized by said sensor means (12) including said sensing capacitor (16) having one probe connected to ground and located on the interior of said tank for changing from a predetermined capacitance in response to contact with liquid, a reference capacitor (18), a positive voltage source (20), said bridge circuit (22) having two arms connected at a common input juncture to said voltage source (20) and with a first of said arms including said sensing capacitor (16) and the second of said arms including said reference capacitor (18), said control means (14) further including integration means (32, FIGS. 2 and 3) for supplying power to said sensor means (12) and for receiving said positive sensor signal to cease filling by producing a control signal (A), said integration means (32, FIGS. 2 and 3) including power supply means (FIG. 3) which receives an external voltage and limits that voltage to supply said integration means (32, FIGS. 2 and 3) and said sensor means (12) with said positive voltage source (20), and driver means (42) for receiving said positive sensor signal to produce said control signal (A) to cease filling, comparator means (24) responsive to the outputs of said arms to sense the differential therebetween and to continuously produce said positive sensor signal when the capacitance of said sensing capacitor (16) increases from said predetermined capacitance, said comparator means (24) including said operational amplifier (26) having a non-inverting input connected to said output of said second arm and an inverting input connected to said output of said first arm for producing said positive sensor signal in response to said sensing capacitor (16) increasing its capacitance from said predetermined capacitance, and translator means (54) for receiving said control signal (A) from the integration means 32 and producing a plurality of command signals which will operate any one of a float, thermistor, or optic probe type sensor loading monitor.

* * * * *